(12) United States Patent
Li

(10) Patent No.: US 8,215,460 B2
(45) Date of Patent: Jul. 10, 2012

(54) AUTOMATIC SLACK ADJUSTER FOR AUTOMOBILE

(76) Inventor: Hou Qing Li, Zhugang Town (CN)

( * ) Notice: Subject to any disclaimer, the term of this patent is extended or adjusted under 35 U.S.C. 154(b) by 150 days.

(21) Appl. No.: 12/867,008

(22) PCT Filed: Jun. 30, 2009

(86) PCT No.: PCT/CN2009/000732
§ 371 (c)(1),
(2), (4) Date: Aug. 10, 2010

(87) PCT Pub. No.: WO2010/108302
PCT Pub. Date: Sep. 30, 2010

(65) Prior Publication Data
US 2011/0073422 A1 Mar. 31, 2011

(30) Foreign Application Priority Data
Mar. 24, 2009 (CN) .......................... 2009 1 0096930

(51) Int. Cl.
*F16D 65/56* (2006.01)

(52) U.S. Cl. ............................... 188/79.55; 188/196 BA

(58) Field of Classification Search .... 188/79.55–79.62, 188/196 BA, 196 V
See application file for complete search history.

(56) References Cited

U.S. PATENT DOCUMENTS

| 4,561,523 A * | 12/1985 | Ott ............................. 188/79.55 |
| 7,757,824 B2 * | 7/2010 | Echambadi et al. ....... 188/79.55 |
| 2005/0274578 A1 * | 12/2005 | Chadha et al. ............... 188/71.9 |
| 2007/0209889 A1 * | 9/2007 | Echambadi et al. ...... 188/196 D |

* cited by examiner

*Primary Examiner* — Christopher Schwartz
(74) *Attorney, Agent, or Firm* — Kile Goekjian Reed & McManus PLLC

(57) ABSTRACT

This invention is to provide an automatic slack adjuster for automobile, belongs to technical domain of automobile mechanisms. The problem of lower safety, poor in universality and higher cost appeared in existing brake system of automobile has been solved by this invention. This automatic slack adjuster for automobile consisting of the casing, worm gear and worm which is engaged with the former are installed inside of the casing, there is a ring gear fixed on an control arm, in the casing there is a one-way clutch device connected with the worm and a clutch control device of the one-way clutch, the said control device comprising a pinion engaged with the ring gear and connected with the casing and a small skew gear connected with the said one-way clutch device, the small skew gear is connected with the casing by axially sliding, the pinion is circumferentially fixed, by axially sliding connected with the small skew gear, an adjusting nut is fitted on the casing to restrict and adjust the sliding distance of the small skew gear, there is a setting bolt spring on the small skew gear to allow the small skew gear (16) return to its position so that to maintain a pre-set clearance to the adjusting nut. This automatic slack adjuster for automobile can adjust the pre-set clearance, and possess advantages of wider clearance and good versatility, etc.

4 Claims, 3 Drawing Sheets

AUTOMATIC SLACK ADJUSTER FOR AUTOMOBILE

FIELD OF THE INVENTION

This invention belongs to technical domain of automobile, is related to a control arm, in particular to an automatic slack adjuster for automobile.

TECHNICAL BACKGROUND

The typical braking for automobile is realized by a contacting friction between a brake shoe and a brake drum. The frequently contacting friction exists between the brake shoe and the brake drum in the period of automobile running, and the clearance of both brake shoe and brake drum will become larger due to erosion, which has influence on the safety of the brake device during the vehicle operation. Usually there is an adjuster which can automatically adjust the brake clearance between the brake shoe and the brake drum in existing brake device of automobile. This adjuster can compensate the abrasion losses of the clearance in the brake shoe and the brake drum and then maintain the said clearance within in a constant value thus to improve the safety of working condition for the brake device of automobile.

"An automatic slack adjuster for automobile" is published under the Chinese Patent No. 200710055529.3, which consists of a casing in which a worm gear and a worm shaft are installed; on one end of the worm there is a set of coil spring, a spring seat and a spring retainer; a cam overrun clutch is connected with a socket on the worm shaft; the driven screw gear thereof is engaged with a driving screw gear of a clearance control device; the clearance control device comprises a planetary gear, a gear shaft, a driving screw gear; there is a damp device including an adjusting screw, spring and steel balls disposed on the left end of the driving screw gear; in the worm gear hole there is a control arm unit installed coaxially with the worm gear, the control arm unit comprises a sun gear coaxially installed in the worm gear hole, a tooth shaped socket, a spring retainer and a control arm, the sun gear is engaged with the planetary gear.

The driving screw gear is engaged with the driven screw gear of a cam overrun clutch; the screwed teeth is on the left end of the driving screw gear and three protruding sector blocks, each central angle being $\alpha$, is on the right end; a straight gear engaged with the sun gear is installed on the right end of the planetary gear, there are three sector grooves at the left end of the planetary gear, each central angle is $\beta$. When three protruding sector blocks on the driving gear inserts into the three grooves on the planetary gear, a sector space $\alpha-\beta=\gamma$ appears between the protruding sector blocks and grooves. This angle is a racing angle of the planetary gear during normal braking of the brake system, which is a pre-set clearance by the clearance control device; Knowing from the above explanation, $\gamma$ is a racing angle of the planetary gear during normal braking of the brake system, it is also a fixed value. A fixed racing angle can only be applied for certain one or several brake systems, if it is inapplicable, then it should be redesigned to define the angle $\gamma$, which, therefore, causes poor universality. In order to maintain the angle $\gamma$ within a given range, a rather high production precision for manufacturing of the driving gear and the planetary gear is needed, which increase the cost of manufacturing and reduces the applicable field.

SUMMARY OF THE INVENTION

This invention aims to provide one kind of slack adjuster whose brake clearance pre-set value can be adjusted, and with wider clearance value as well as good universality in application, in order to solve the above mentioned shortages of the existing slack adjuster.

The purpose of this invention can be realized by means of the following technological program: a kind of automatic slack for automobile consisting of a casing, a control arm connected to the casing, a worm gear and a worm which is engaged with the former are installed inside of the casing, a ring gear is fixed on an control arm, in the casing there are the one-way clutch device connected with the worm and the clutch control device of the one-way clutch device, the said control device comprising a pinion engaged with the ring gear and connected with the casing, and a small skew gear connected with the said one-way clutch device, the small skew gear is connected with the casing by axially sliding, the pinion is circumferentially fixed, by axially sliding connected with the small skew gear, an adjusting nut is fitted on the casing to restrict and adjust the sliding distance of the small skew gear, there is a setting bolt spring for the small skew gear to allow the small skew gear return to its position so that to maintain a pre-set clearance to the adjusting nut, which is characterized in that there is an adjusting hole on the said casing, the one end of the said adjusting nut is in the adjusting hole and connected by thread with adjusting hole, and the other end thereof is extended out toward the direction of the small skew gear; the adjusting nut is cylindrical, the other end of said arbor is inserted in the adjusting nut.

This automatic slack adjuster can adjust automatically the brake clearance between the brake shoe and the brake drum, can also adjust the pre-set range of and setting range of brake clearance. When being used, the control arm is anchored on the axle, and the casing of the control arm can be rotated around the control arm, the worm gear is connected with the brake device and the casing is connected with a brake pedal device.

When braking, the whole casing is pushed to rotate around the control arm, due to the ring gear anchored on the control arm does not rotate with the casing, hence the pinion in the control unit which is engaged with the ring gear is driven to rotate, so the small skew gear is also driven to rotate. The small skew gear is connected with the one-way clutch device, and also connected to the casing by axially sliding, the pinion and the small skew gear are circumferentially fixed but connected by axially sliding, there is a clearance between the small skew gear and the adjusting nut, thus the small skew gear without restriction in the axial direction can not bring the one-way clutch moving, in contrary, it is approaching toward the adjusting nut until contacting with the latter under the action of one-way clutch.

When braking, if the automobile is braked before the small skew gear reaches the adjusting nut, it shows that the brake clearance between the brake shoe and the brake drum is within the normal brake range. When braking, If the automobile doesn't stop after the small skew reaches the adjusting nut, it shows that that the clearance between the brake shoe and the brake drum is too large, the stroke of brake pedal is increased, thus the incremental stroke will bring the small skew gear to rotate continuously, since the axial movement of the small skew gear is restricted by the adjusting nut, the small skew gear turns the one-way clutch device to the disengaged position; as soon as the braking of automobile is finished and the brake is released, the whole casing rotates to the reverse direction, at this moment, the pinion engaged with the ring gear also rotates to the reverse direction and makes the small skew gear to rotate to the reserve direction too, the small skew gear keeps moving continuously after it returns back to its original position because of the incremental stroke. Thus the one-way clutch is turned to the engaged position, and contacts with the worm shaft, the latter is pushed to rotate and makes the worm gear to rotate, the turned portion is just equal to the incremental portion of the brake clearance, by means of that the automatic adjusting of brake clearance between the brake shoe and the brake drum is fulfilled.

In this approach the pre-set clearance between the adjusting nut and the small skew gear is adjustable, if the pre-set clearance H is small, then the brake clearance between the brake shoe and the brake drum will also be automatically reduced during the braking of the automobile. A setting bolt spring can make the small skew gear re-position rapidly and precisely.

The said clutch device of the above mentioned automatic slack adjuster for automobile consists of a big skew gear socket connected on the worm gear and a fixed socket anchored on the worm shaft, Inside of the big skew gear and the fixed socket there is the coil clutch spring connected by both ends with the big skew gear and the fixed socket to realize their clutch function between the big skew gear with the fixed socket, the said big skew gear and small skew gear are engaged each other. Normally the coil clutch spring is under stretching situation with its circumference pressing both on the big skew gear and the fixed socket to make them in connection situation. As the automobile brakes, the small skew gear drives the big skew gear to rotate, the big skew gear moves along the screw direction of the coil clutch spring and when the coil clutch spring is compressed, its circumference separate from both the big skew gear and the fixed socket and to make them in disconnection situation, the big skew gear and the fixed socket are in disconnecting situation, the rotation of the big skew gear can not bring the fixed socket and the worm gear rotation. When releasing the brake, due to the coil clutch spring won't be under action by any force, thus it gets back to its original stretching situation, the coil clutch spring makes the big skew gear and the fixed socket connected firmly each other realizing the engaged situation, as the small skew gear brings the big skew gear rotate to the reverse direction, it also brings the fixed socket to rotate along with the big skew gear. The rotation of the fixed socket drives the worm shaft to rotate, thus the worm gear is driven to rotate, so that the brake clearance between the brake shoe and the brake drum is adjusted.

In the said automatic slack adjuster for automobile, the said small skew gear is anchored on a arbor, one end of the arbor is inserted in the casing and the other end is connected firmly in circumferential direction but by axially sliding with the pinion, there is a cylindrical pinion shaft, there is at least one sliding groove to the axial direction on the inner side wall of the end of the pinion shaft, the end of the said arbor is inserted in the arbor shaft and there is a positioning key at the end of the pinion shaft which can slide along the sliding groove. With this arrangement, the small skew gear can be connected with the casing by sliding and with the pinion by axially sliding. The small skew gear can drive the big skew gear to rotate through the pinion.

In the said automatic slack adjuster for automobile, an adjusting hole is in the said casing, one end of the said adjusting nut is inserted in the adjusting hole and connected by thread each other, and the other end is extended out the hole and toward the direction of the small skew gear, the adjusting nut is cylindrical, the other end of the said arbor is inserted in the adjusting nut making the small skew gear to slide axially. The distance between the small skew gear and the adjusting nut is the pre-set clearance H, to rotate the adjusting nut can adjust the clearance between the adjusting nut and the small skew gear, therefore, the brake clearance of this automatic slack adjuster is a range of value, which is 3.4° to 9.4°. This range is bigger than that of other similar products.

In the said automatic slack adjuster for automobile, one end of the worm gear is extended out the casing, the said fixed socket is connected with the said end, a conical gear pair matched each other is disposed between the fixed socket and the worm shaft, there is a coil spring effecting both on the worm shaft and the casing respectively, on the other end of the worm gear, the worm gear presses on the fixed socket under action of the coil spring, but there is a conical gear pair, so called spline structure, between the fixed socket and the worm, both of them fixed connected circumferentially. To turn the one end of worm shaft extended over the casing can't bring the worm gear rotating, because the worm shaft is restricted by the worm gear and the clutch device, hence overcoming the force produced by coil spring, the worm gear has to move toward the direction for separating from the fixed socket. When the torsion becomes bigger enough, the worm shaft will separate from the fixed socket and will bring the worm gear turn a certain angle, to realize the manual magnifying the brake clearance.

In the said automatic slack adjuster for automobile, a thrust bush is socket connected on the said worm shaft, the abovementioned small skew gear, the fixed socket and the coil clutch spring are all connected outside with the thrust bush, a bearing is socket connected with the worm gear, the said small skew gear is pressed on the outer circle of the bearing, the thrust bush is pressed on the inner circle of the bearing. The thrust bush and the bearing make small skew to rotate smoothly.

Comparing to the existing technology, this automatic slack adjuster has the advantages as follows:

1, The one-way clutch device formed by the small skew gear, the coil clutch spring and the clutch is of a "stepless clutch", it can control the brake clearance in stepless, promptly and accurately.
2, The control arm drives the worm gear via the ring gear, the pinion and the small skew shaft, because the relative movement of ring gear and the pinion, big skew gear and the small skew gear are all constant speed circular motion, the fixed point of control arm is random position, it results in the product with versatility and easy for installation.
3, The output clearance of the automatic slack adjuster is realized by changing the position of the adjusting screw which control the pre-set clearance H (the clearance between the adjusting screw and the small skew gear), therefore although there are different output value of diversity control arms, the parts for assembly are the same, so the product cost can be reduced apparently.
4, The output clearance of the automatic slack adjuster is in a wide range, makes the normal clearance angels ranging from 3.4° to 9.4°, compared to 7.4° to 9.4° of the similar product only.

Figure 1:
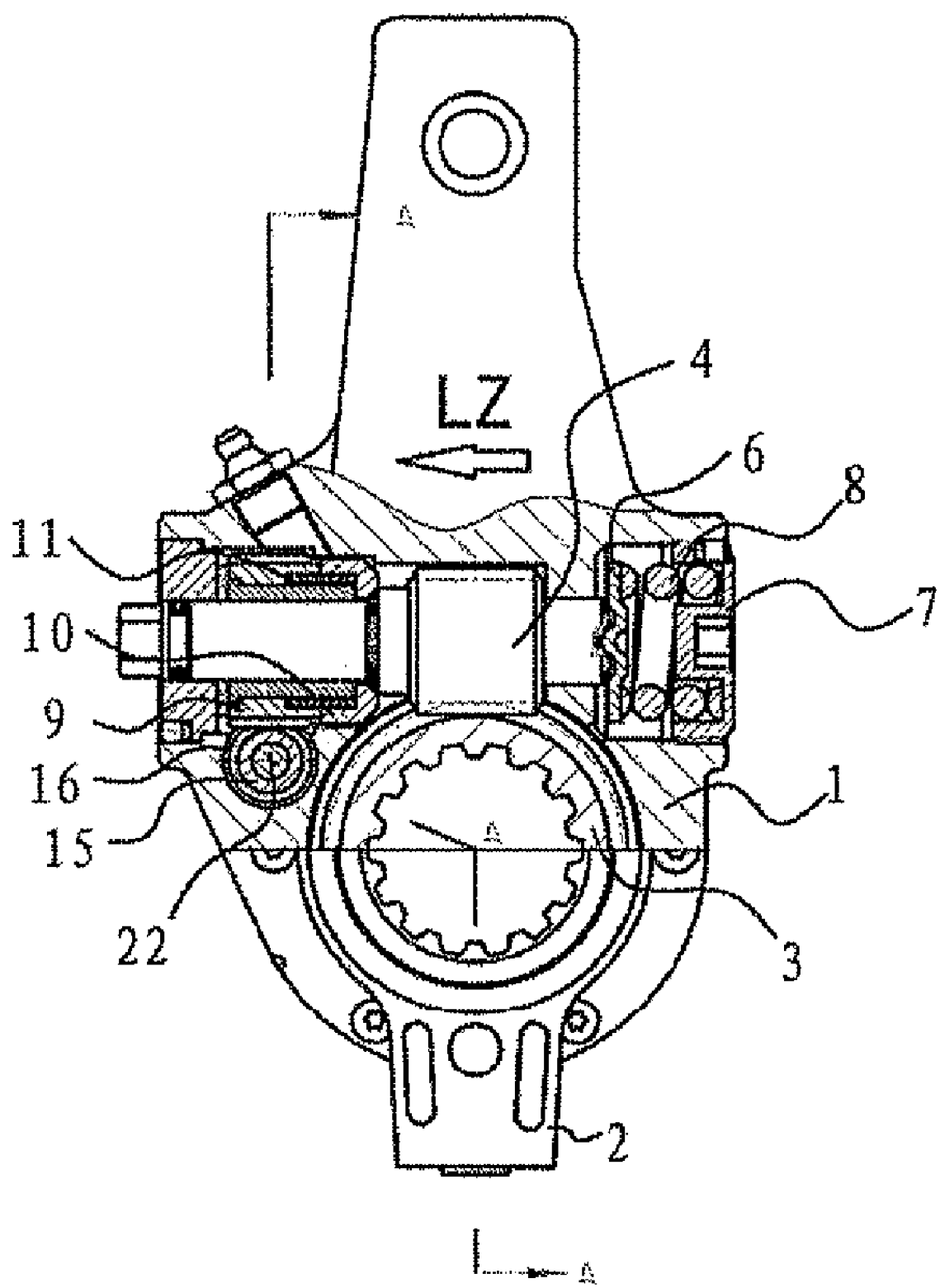
FIG. 1 is a sketch showing B-B's structural view of the automatic slack adjuster in FIG. 2.

Wherein in figures: casing 1, control arm 2, worm gear 3, worm shaft 4, ring gear 5, spring seat 6, spring retainer 7, coil spring 8, big worm gear 9, fixed socket 10, coil clutch spring 11, conical gear pair 12, thrust bush 13, bearing 14, pinion 15, small skew gear 16, adjusting nut 17, setting bolt spring 18, sliding groove 19, positioning key 20, pinion shaft 21, arbor 22, adjusting hole 23.

DETAILED DESCRIPTION OF THE PREFERRED EMBODIMENTS

Figure 2:
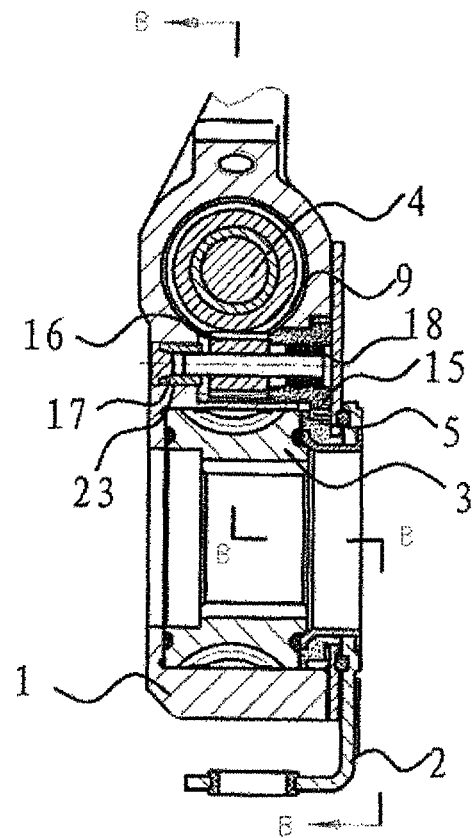
FIG. 2 is a sketch showing A-A's structural view in FIG. 1.
Figure 3:
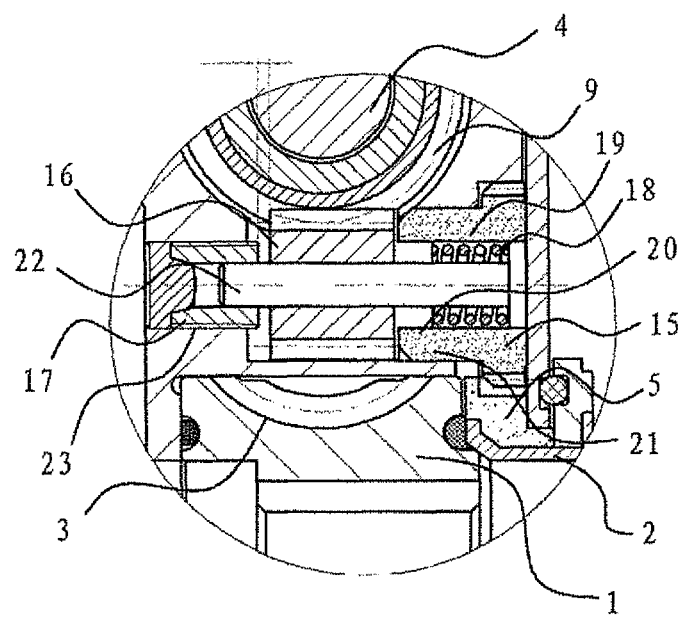
FIG. 3 is a sketch showing the magnified structural view of the control device.
Figure 4:
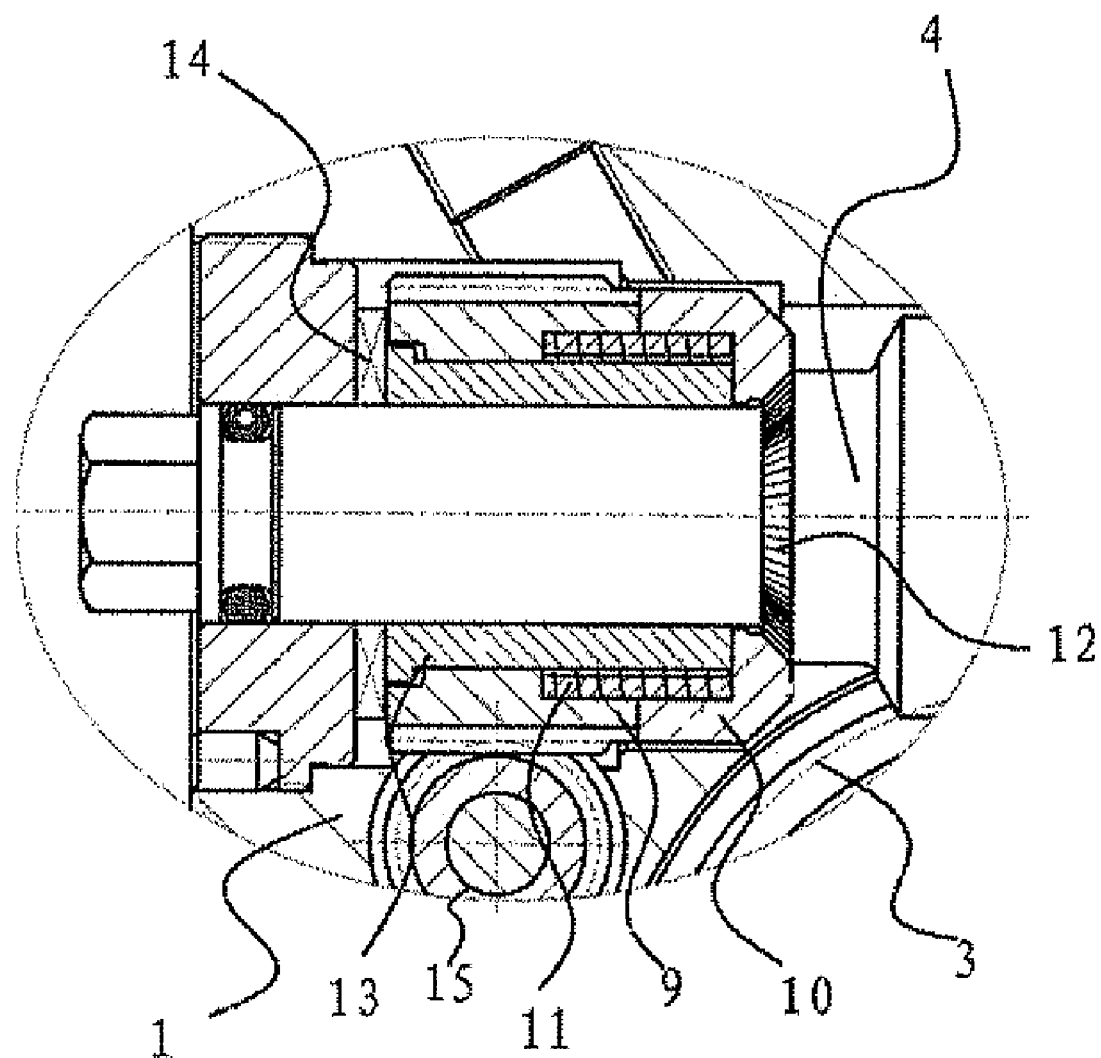
FIG. 4 is a sketch showing the magnified structural view of the one-way clutch device in FIG. 1.

A preferred embodiment of the invention is further illustrated, but is not only limited to, in the accompanying drawings in which:

As shown in FIG. 1, FIG. 2, FIG. 3 and FIG. 4, this automatic slack adjuster consisting of the casing 1, the control arm 2, the worm gear 3, the worm shaft 4, the ring gear 5, one-way clutch device and the clutch control device thereof, is used for fulfilling an automatic adjusting of the clearance between the brake shoe and the brake drum and can adjust pre-set value of clearance.

In detail, the control arm 2 anchored on the axle, the ring gear 5 is installed on the control arm 2, the teeth of the gear are at the inner ring of ring gear 5, the worm gear 3 is set inside of the casing 1 and coaxially with the ring gear 5, the casing 1 connected with the control and 2 can rotate relatively to the control arm. The worm shaft 4 is fixed inside of the casing 1 and engaged with the worm gear 3, one end of the worm shaft 4 is extended out of the casing 1 with hexagonal end structure thus using a spanner or other similar tools to manually turn the worm shaft 4, in that end of casing 1 there are one-way clutch device and the control device of one-way clutch device; the other end of the worm shaft 4 is inside of the casing 1 which terminal face connected with a the spring seat 6 by a bolt, there is a spring retainer 7 on the casing 1, a coil spring 8 by which to contact the worm shaft 4 with one-way clutch device is provided between a spring retainer 7 and the spring seat 6.

The one-way clutch device includes a big skew gear 9 which socket connected with the worm shaft 4 and a fixed socket 10 anchored on the worm shaft 4, inside of the big skew gear 9 and the fixed socket 10 there is a coil clutch spring 11 linked by both ends with the big skew gear 9 and the fixed socket 10 respectively to implement of connection or disconnection of the big skew gear 9 and the fixed socket 10, the big skew gear 9 engages a small skew gear 16. Normally the coil clutch spring 11 is under stretching situation, it presses circumferentially both on the big skew gear 9 and the fixed socket 10 and makes them connected. When the automobile brakes, the small skew gear 16 brings the big skew gear 9 to rotate, the big skew gear 9 moves along the screw direction of coil clutch spring 11 and when the coil clutch spring is compressed, its circumference separate from both the big skew gear 9 and the fixed socket 10 and makes them disconnected, the big skew gear 9 and the small bushing 10 are in disconnection situation, the rotation of the big skew gear can not bring the fixed socket and the worm gear rotation. When releasing the brake, due to the coil clutch spring 11 won't be under action by any force, thus it gets back to its original stretching situation, the coil clutch spring 11 makes the big skew gear and the fixed socket connected firmly each other realizing the engaged situation, as the small skew gear brings the big skew gear 9 rotate to the reverse direction, the small skew gear 9 brings the fixed socket 10 to rotate along with the big skew gear. The rotation of the fixed socket 10 drives the worm shaft 4 to rotate, thus the worm gear 3 is driven to rotate, so that the brake clearance between the brake shoe and the brake drum is adjusted.

A matched conical gear pair 12 is set between fixed socket 10 and the worm shaft 4, the worm shaft 4 is connected circumferentially with the fixed socket 10 under the action of the coil spring 8. A thrust bush 13 is socket connected with the worm shaft 4, while the big skew gear 9, the fixed socket 10, and the coil clutch spring 11 are all socket connected outside with the thrust bush 13, the bearing 14 is socket connected on the worm shaft 4, the big skew gear 9 is pressed on the outer circle of the bearing 14, the thrust bush 13 is pressed on inner circle of the bearing 14.

The control device includes the pinion 15 connected with the casing 1 and is engaged with the ring gear 5 and the small skew gear 16 which is engaged with the big skew gear 9. The small skew gear 16 is connected with the casing 1 by axially sliding, the pinion 15 is circumferentially fixed on the small skew gear 16 and connected with the latter by axially sliding, there is an adjusting nut 17 in the casing 1 to restrict and adjust the sliding distance H of the small skew gear 16, there is a setting bolt spring 18 on the small skew gear 16 for the latter returning to position and maintaining a fixed clearance to the adjusting nut 17 in case of no braking.

There is an adjusting hole 23 in the casing 1, the adjusting nut 17 is cylindrical, one end of the adjusting nut 17 is inserted in the adjusting hole 23 and connected by thread with the adjusting hole 23 and the other end is extended out of the hole 23 and toward the direction of the small skew gear 16; the small skew gear 16 is anchored on a arbor 22, the one end of the arbor 22 is circumferentially connected but axially sliding with the pinion 15, and the other end of the arbor 22 is inserted in the adjusting nut 17 making the small skew gear 16 to slide axially. The distance between the small skew gear 16 and the adjusting nut 17 is the pre-set clearance H, therefore, the brake clearance of this automatic slack adjuster is a range of value, which is 3.4° to 9.4°. This range is bigger than that of other similar products.

There is a cylindrical pinion shaft 21 in the pinion 15, two sliding grooves 19 symmetrically, along the axial direction placed on the inner side wall of the end of the pinion shaft 21, the end of the arbor 22 is inserted in the pinion shaft 21 and the positioning key 20 is provided in the end of pinion shaft 21 which can slide along the sliding groove 19.

When being used, the control arm 2 is anchored on the axle, and the casing 1 of the control arm 2 can be rotated around the control arm 2, the worm gear 3 is connected with the brake device and the casing 1 is connected with the brake pedal device.

When braking, the whole casing 1 is pushed to rotate around the control arm 2, due to the ring gear 5 anchored on the control arm 2 does not rotate with the casing 1, hence the pinion 15 in the control unit which is engaged with the ring gear 5 is driven to rotate, so the small skew gear 16 is also driven to rotate. The small skew gear 16 is connected with the one-way clutch device, and also connected with the casing 1 by axially sliding, the pinion 15 and the small skew gear 16 are circumferentially fixed but connected by axially sliding, there is a clearance between the small skew gear 16 and the adjusting nut 17, thus the small skew gear 16 without restriction in the axial direction can not bring the one-way clutch moving, in contrary, it is approaching toward the adjusting nut 17 until contacting with the latter under the action of one-way clutch.

When braking, if the automobile is braked before the small skew gear 16 reaches the adjusting nut 17, it shows that the brake clearance between the brake shoe and the brake drum is within the normal brake range. When braking, If the automobile doesn't stop after the small skew gear 16 reaches the adjusting nut 17, it shows that that the clearance between the brake shoe and the brake drum is too large, the stroke of brake pedal is increased, thus the incremental stroke will bring the small skew gear 16 to rotate continuously, since the axial movement of the small skew gear 16 is restricted by the adjusting nut 17, the small skew gear 16 turns the one-way clutch device to the disengaged position; as soon as the braking of automobile is finished and the brake is released, the whole casing 1 rotates to the reverse direction, at this moment, the pinion 15 engaged to the ring gear 5 also rotates to the reverse direction and makes the small skew gear 16 to rotate to the reserve direction too, the small skew gear 16 keeps moving continuously after it returns back to its original position because of the incremental stroke. Thus the one-way clutch is turned to the engaged position, and contacts with the worm shaft 4, the latter is pushed to rotate and makes the worm gear 3 to rotate, the turned portion is just equal to the incremental portion of the brake clearance, by means of that the automatic adjusting of brake clearance between the brake shoe and the brake drum is fulfilled.

The pre-set clearance between the adjusting nut 17 and the small skew gear 16 is adjustable, if the pre-set clearance H is small, then the brake clearance between the brake shoe and the brake drum will also be automatically reduced during the braking of the automobile. A setting bolt spring can make the small skew gear 16 re-position rapidly and precisely.

Except for automatic adjustment, the manual adjustment is also applicable by means of turning the hexagonal end of the worm shaft 4 extending out of the casing 1, because the worm shaft 4 is restricted by the worm gear 3 and the clutch device, it can't bring the worm gear 3 to rotate, overcoming the force produced by coil spring 8, the worm shaft 4 has to be moved toward the direction for separating from the fixed socket 10. When the torsion becomes larger enough, the worm gear 3 will separate from the fixed socket 10 and will bring the worm gear 3 turn a certain angle, to realize the function of manual adjustment of the brake clearance.

The example of implementation explicated herein is only the principle of this invention. The technical people in related technical domain of this invention can make diversity amendment or complements or use similar methods instead, but all of those can't depart from the principle of this invention or exceeded the defined range stipulated in the "Claims".

Nevertheless, some nomenclatures are mostly used in this article such as: casing 1, controller level 2, worm gear 3, worm shaft 4, gear ring 5, spring seat 6, spring retainer 7, coil spring 8, big skew gear 9, fixed socket 10, coil clutch spring 11, conical gear pair 12, thrust bush 13, bearing 14, pinion 15, small skew gear 16, adjusting nut 17, setting bolt spring 18, sliding groove 19, positioning key 20, pinion shaft 21, arbor 22, and adjusting hole 23, but some other nomenclatures may be used as well. To use those nomenclatures is only for easy explication and elaboration of the principle of this invention; thus to deem them as a supplemental restriction is disobedient to the essence of this invention.

What is claimed is:

1. An automatic slack for automobile comprising: a casing (1);
   a control arm (2) connected with the casing (1);
   a worm gear (3);
   a worm (4) which is engaged with the former and are installed inside of the casing (1),
   a ring gear (5) fixed on the control arm (2);
   a one-way clutch device connected with the worm (4) in the casing (1);
     a clutch control device of the one-way clutch, wherein the said control device comprises a pinion (15) engaged with the ring gear (5) and connected with the casing (1);
     a small skew gear (16) connected with the one-way clutch device, the small skew gear (16) being connected with the casing (1) by axially sliding, the pinion (15) being circumferentially fixed, by axially sliding and connected with the small skew gear (16);
     an adjusting nut (17) fitted on the casing (1) to restrict and adjust the sliding distance of the small skew gear (16);
     a setting bolt spring (18) on the small skew gear (16) to allow the small skew gear (16) to return to its position so as to maintain a pre-set clearance to the adjusting nut (17);
     an adjusting hole (23) on the casing (1), one end of the adjusting nut (17) being in the adjusting hole (23) and being connected by thread with the adjusting hole (23), and the other end of the adjusting hole being extended out toward the direction of the small skew gear (16); the adjusting nut (17) being of cylindrical shape; and
   an arbor (22), one end of which is inserted in the adjusting nut (17).

2. The automatic slack for automobile according to the claim 1, wherein the small skew gear (16) is anchored on the arbor (22), one end of the arbor (22) is inserted in the casing (1) and the other end is connected firmly in circumferential direction and sliding axially with the pinion (15).

3. The automatic slack for automobile according to the claim 2, further comprising:
   a cylindrical pinion shaft (21) installed in the pinion(15);
   at least one sliding groove (19) formed along the axial direction on the inner side wall of the end of the pinion shaft (21), wherein the end of the arbor (22) is inserted in the gear shaft (21) and a positioning key (20) is provided in the end of the gear shaft (21) which can slide along the sliding groove (19).

4. The automatic slack for automobile according to the claim 1 wherein the thrust bush (13) is socket connected with the worm shaft (4), the big skew gear (9), the fixed socket (10), and the coil clutch spring (11) are all socket connected outside with the thrust bush (13), and a bearing (14) is socket connected with the worm shaft (4), the big skew gear (9) being pressed on the outer circle of the bearing (14), the thrust bush (13) being pressed on the inner circle of the bearing (14).

* * * * *